United States Patent
Koch et al.

(10) Patent No.: US 7,484,665 B2
(45) Date of Patent: Feb. 3, 2009

(54) METHOD AND DEVICE FOR READING DEEP BARCODES BY WAY OF OPTICAL INTERFERENCE

(75) Inventors: Peter Koch, Luebeck (DE); Gereon Huettmann, Luebeck (DE); Edmund Koch, Dresden (DE); Eva Lankenau, Luebeck (DE)

(73) Assignee: Medizinisches Laserzentrum Luebeck, Luebeck (DE)

( * ) Notice: Subject to any disclaimer, the term of this patent is extended or adjusted under 35 U.S.C. 154(b) by 661 days.

(21) Appl. No.: 10/551,308

(22) PCT Filed: Mar. 13, 2004

(86) PCT No.: PCT/DE2004/000508

§ 371 (c)(1),
(2), (4) Date: Sep. 28, 2005

(87) PCT Pub. No.: WO2004/088580

PCT Pub. Date: Oct. 14, 2004

(65) Prior Publication Data

US 2006/0175412 A1     Aug. 10, 2006

(30) Foreign Application Priority Data

Apr. 1, 2003   (DE) ................................ 103 14 633

(51) Int. Cl.
*G06K 7/10* (2006.01)
(52) U.S. Cl. ................................................. 235/462.01
(58) Field of Classification Search ............. 235/462.01
See application file for complete search history.

(56) References Cited

U.S. PATENT DOCUMENTS

| 4,794,238 A | 12/1988 | Hampton |
| 5,129,974 A | 7/1992 | Aurenius |
| 2004/0150829 A1 | 8/2004 | Koch et al. |

*Primary Examiner*—Karl D Frech
*Assistant Examiner*—Tae W Kim
(74) *Attorney, Agent, or Firm*—Larson & Larson, PA; James E. Larson; Herbert W. Larson

(57) ABSTRACT

This invention relates to a method for reading, while using optical interference, a barcode that extends into the depth of a substrate. The barcode is represented by an area with marks in the substrate that is partially transparent to electromagnetic radiation. The inventive method comprises the steps of irradiating the substrate with short coherence length light from a broad-band light source, dividing the light up into reference light and measuring light, returning the reference light and the measuring light back-scattered or reflected in the marked area to an analytical unit, determining the reflectance or the reflectivity of the substrate for all layer depths in the marked area from the interference of the reference light and the measuring light and interpreting the result as a barcode.

8 Claims, No Drawings

METHOD AND DEVICE FOR READING DEEP BARCODES BY WAY OF OPTICAL INTERFERENCE

PRIOR APPLICATIONS

This application is a §371 U.S. National Phase patent application basing priority on International Application No. PCT/DE2004/000508, filed on Mar. 13, 2004, which in turn bases priority on German Application No. DE 103 14 633.4, filed on Apr. 1, 2003.

BACKGROUND OF THE INVENTION

1. Field of the Invention

The invention relates to a method for reading a bar code extending into the depth of a substrate by means of optical interference, the bar code being represented by an area with marks in the substrate which is partly transparent to electromagnetic radiation.

2. Description of the Prior Art

A standard, usually printed bar code comprising a plurality of parallel lines or bars for machine readable article identification is generally known. A deep or depth bar code is understood to be one in which the bars are not arranged on or parallel to the marked substrate surface but are instead perpendicular to the surface in different depth planes of the substrate material.

For an exemplified explanation a partial volume of the substrate with a characteristic width D (e.g. edge length, diameter) and height H (perpendicular to the substrate surface) is considered as the marking area having the deep bar code. The area can be subdivided into N layers of identical thickness dH in each case, so that N.dH=H. Each individual layer may be marked or unmarked and the mark at least consists of a change in the optical characteristics compared with the unmarked substrate influencing the backscattering or reflection of light in at least one, preferably non-ionizing spectral range. On determining the positions of the marked layers with a resolution better than the layer thickness dH, this gives a bar code of length N bits.

It is advantageous when using deep bar codes that it is possible to accommodate a larger number of deep bar codes on substrates having a limited surface, because an individual bar code only requires a cross-sectional surface of approximately $D^2 < 1000$ μm$^2$. This e.g. makes it possible to record additional sample or specimen information or a detailed analytical history on the sample or specimen substrate. If a plurality of deep bar codes are preferably positioned in juxtaposed manner in such a way that linear movements of the reader or substrate permit the sequential reading of the bar code, it is possible to store in simple manner and with limited space a large data quantity (1000 deep bar codes per square millimetre). The individual reading processes remain independent of one another. In particular, the deep bar codes can be recorded at different times and with different writing or recording devices.

Another advantage of deep bar codes is the increased security against manipulation. With the naked eye a deep bar code appears in the visible range as a neutral "fuzzy spot". Unlike a conventional bar code, without a reader it cannot be detected and translated into a number string. Thus, at least suitable devices are needed for reading and writing in order to be able to carry out specific manipulations, which would often fail as a result of the cost involved.

Numerous different methods can be used for writing or recording such deep bar codes. It is e.g. possible to produce labels from a plurality of superimposed, glued film layers with a differing transparency or refractive index, the sequence of the transparency change containing the bar code. In the case of semiconductors or other crystal substrates the bar code could be preset during the epitactic growth by a controlled modification of the material provided or the growth conditions.

A particularly interesting possibility for producing complete falsification-proof (because irreproducible) deep bar codes consists of introducing scattered particles into a hardening, optically transparent matrix, e.g. cast resin. The once fixed, precisely measured distribution of the scattered particles in the marking area represents a unique code, which cannot be precisely copied by similar procedures. Possible uses of such unique "number plates" are in the noninterchangeable marking of equipment, whose movement and use scope is subject to strict controls, such as military vehicles and weapon systems.

So-called internal engraving with laser light is suitable for glass substrates. Using brief laser light flashes, precisely located volumes are damaged in a selectable depth beneath the glass surface in such a way that in said volumes the substrate significantly loses transparency. It is already possible to engrave symbols visible with the eye in the glass without the glass surface suffering. Uses of this technology are the marking and archiving of biological and medical specimen carriers, e.g. for high throughput screening (HTS), which must not be contaminated by deposits on an engraved surface.

Independently of the details of the recording process, the problem arises of rapidly reading out with limited apparatus costs a deep bar code recorded in a marking area on a substrate, and this also constitutes the problem of the present invention.

SUMMARY OF THE INVENTION

This problem is solved by the features of claim 1. The subclaims relate to advantageous developments and a device for performing the method.

Interferometers, which do not require moving parts, are particularly suitable for performing the method using a limited amount of equipment and, consequently, inexpensively.

A first suitable measuring method consists of a variant of optical coherence tomography (OCT), which is e.g. described in WO 02/084263. OCT systems were specially developed for depth-resolved structural examinations and normally operate according to the Michelson interferometer principle. Short coherence length light is irradiated into a specimen, and from different specimen layer depths is backscattered or reflected with a varying intensity. If e.g. the specimen surface is seen as the mirror of the reference arm in the Michelson interferometer, the backscattered or reflected light can be subdivided into specimen light and reference light and made to interfere in an analytical unit. From the resulting interference pattern, conclusions can be drawn regarding the travel time distribution of the specimen light and, therefore, the scattering or reflecting power of the different layer depths S(z) in the specimen.

The expert is aware of a second suitable method from DE 43 09 056 A1, which is also known as "spectral radar". Light from a broad band light source is scattered into the specimen in a plane with a spacing z from a reference plane (z=0), and on it is superimposed backscattered light from the reference plane. There is, consequently, a constructive or destructive interference for a random, fixed spacing z of the planes as a function of which of the irradiated wavelengths λ is considered. If a plurality of planes with spacing from an interval [z1, z2] to the reference plane participates in the backscattering, the starting intensity $I(\lambda)$ is to be considered as an integral over this interval. When using broad band light, e.g. from a superluminescence diode, the interference light is spectrally resolved and is normally imaged on a photodiode line or a comparable device. This permits the measurement of the distribution $I(k)$, $k=2\pi/\lambda$ as the spatial distribution on the sensor line. In a single calculating step, a Fourier transformation of this distribution leads to the depth-dependent scattering or reflecting power $S(z)$.

DETAILED DESCRIPTION OF THE PREFERRED EMBODIMENT

Said interferometers use a clearly defined plane of the specimen, i.e., the specimen surface, as the beam splitter and mirror for the reference light. On reading deep bar codes this is particularly preferred, because a support produced specifically for this purpose, e.g. a label, can be provided easily with an optimum coating for this. However, in some cases it is advantageous to use a reference light mirror outside the support or substrate, such as in a special reference arm, into which the reference light i deflected by means of a beam splitter, or by using a partly reflecting window in the illuminating optics directed towards the substrate. Such constructions are appropriate if e.g. as a result of contamination, aging or mechanical stress damage is to be expected to the substrate plane considered as the reference mirror.

As soon as the scattering power or reflectivity is available in digitized form as a function of the layer depth $S(z)$, the translation of this function by a transcription unit (computer with standard software) into a number string can be brought about in an obvious manner.

Modern interferometer tomographs are able to scan a marking range of up to 2 mm in the case of a layer resolution of 10 μm. This leads to a theoretically attainable bar code length of 200 bits, which is clearly much higher than the necessary 95 bits of the Universal Product Code (UPC). No importance is attached to the precise position of the bar code in the substrate marking area or the characteristic marking area width D, which is oriented with respect to the illuminating optics and need only be a few 10 μm. The absolute spacing [s] dH of adjacent layers or bars in the marking area are also unimportant, provided that they do not drop below the resolution of the interferometric method used and remain constant within limited tolerances over the entire bar code. Using standard methods, there is no difficulty in programming the transcription unit in such a way that relative displacements and distortions of deep bar codes with respect to one another are automatically detected and correctly compensated.

A particular advantage of the method according to the invention is that even optically invisible security marks can be identified. On selecting a substrate material non-transparent in the visible spectrum, but which is partly transparent e.g. in the infrared, it is possible to read marks beneath the surface if it is a priori, known whether and where they are precisely present.

Having thus described the invention, what is claimed and desired to be secured by Letters Patent is:

1. A method for reading, by optical interference, a bar code extending in a direction at about a right angle to a surface of a substrate into a depth of the substrate, said bar code being represented by an area with marks in said substrate partly transparent to electromagnetic radiation, the steps of the method comprising:
    (a) illuminating said substrate with short coherence length light from a broad band light source;
    (b) dividing said light into reference and measurement light;
    (c) returning said reference light and said measurement light back-scattered or reflected in said marking area into an analytical unit;
    (d) determining a back-scattering power or a reflectivity of said substrate for all layer depths in said marking area from an interference of said reference light and said measuring light; and
    (e) interpreting a result of said illuminating, dividing, returning, and determining steps as said bar code.

2. The method according to claim 1, further comprising steps of:
    (a) producing a spatial interference pattern in the analytical unit by superimposing said reference light and said measurement light;
    (b) measuring light intensity distribution with a detection unit within the analytical unit; and
    (c) determining a depth-dependent scattering power of said substrate through use of an evaluating unit.

3. The method according to claim 1, further comprising steps of:
    (a) measuring a spatial, spectrally resolved intensity distribution with a detection unit within said analytical unit after superimposing said reference light and said measurement light; and
    (b) determining a depth-dependent scattering power of said substrate with an evaluating unit.

4. The method according to claim 1, wherein the step of dividing said light into reference and measurement light is performed by a beam splitter deflecting said reference light onto a mirror.

5. The method according to claim 1, wherein the step of dividing said light into reference and measurement light comprises a step of partially reflecting said short coherence length light in a pre-selected plane in an optical path of said short coherence length light directed onto the substrate.

6. The method according to claim 5, wherein said pre-selected plane is a surface of said substrate.

7. The method according to claim 1, wherein said light is invisible IR light.

8. The method according to claim 1, wherein a frequency spectrum for said short coherence length light is employed allowing for a substrate that is non-transparent for visible light to be partly transparent for said short coherence length light.

* * * * *